(12) United States Patent
Ishida et al.

(10) Patent No.: US 9,803,720 B2
(45) Date of Patent: Oct. 31, 2017

(54) CHAIN AND CHAIN GUIDE PLATE

(71) Applicant: TSUBAKIMOTO CHAIN CO., Osaka-shi, Osaka (JP)

(72) Inventors: Hiroki Ishida, Osaka (JP); Shigenobu Sugasawa, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 176 days.

(21) Appl. No.: 14/552,683

(22) Filed: Nov. 25, 2014

(65) Prior Publication Data

US 2015/0152943 A1 Jun. 4, 2015

(30) Foreign Application Priority Data

Nov. 29, 2013 (JP) .................. 2013-248046

(51) Int. Cl.
*F16G 13/08* (2006.01)
*F16G 13/04* (2006.01)

(52) U.S. Cl.
CPC ............. *F16G 13/08* (2013.01); *F16G 13/04* (2013.01)

(58) Field of Classification Search
CPC ........... F16G 13/04; F16G 13/06; F16G 13/08
See application file for complete search history.

(56) References Cited

U.S. PATENT DOCUMENTS

| | | | | |
|---|---|---|---|---|
| 610,583 | A * | 9/1898 | Fox .................. | F16G 13/06 139/333 |
| 1,126,254 | A * | 1/1915 | Morse ................ | F16G 13/06 305/196 |
| 1,266,572 | A * | 5/1918 | Fisher ............... | F16G 13/06 474/228 |
| 1,570,014 | A * | 1/1926 | Stevens ............. | F16G 13/06 254/DIG. 6 |
| 3,061,077 | A * | 10/1962 | Noffsinger ......... | A01D 17/10 198/690.2 |
| 5,291,730 | A * | 3/1994 | Wu ................... | F16G 15/00 474/220 |

(Continued)

FOREIGN PATENT DOCUMENTS

| EP | 1 801 453 A1 | 6/2007 |
|---|---|---|
| EP | 2 280 187 A1 | 2/2011 |

(Continued)

OTHER PUBLICATIONS

Search Report dated Nov. 30, 2015, issued in counterpart United Kingdom Application No. GB1419620.8 (8 pages).

*Primary Examiner* — Minh Truong
(74) *Attorney, Agent, or Firm* — Westerman, Hattori, Daniels & Adrian, LLP

(57) ABSTRACT

The invention provides a chain and a chain guide plate that suppress occurrence of noise during chain traveling while attaining a reduction in costs and also attaining space saving. A chain includes first plate rows and second late rows. Each of the first plate rows includes a guide plate including a guide slide contact section for coming into slide contact with an inner side guide. The guide slide contact section extends in a chain longitudinal direction to be asymmetrical relative to an imaginary center line. During guiding by the inner side guide, lines drawn by the guide slide contact sections of a plurality of the guide plates are continuous in the chain longitudinal direction.

6 Claims, 9 Drawing Sheets

(56) References Cited

U.S. PATENT DOCUMENTS

| | | | | | |
|---|---|---|---|---|---|
| 5,362,282 | A | * | 11/1994 | Lickton | ............... F16G 15/02 474/220 |
| 5,435,789 | A | * | 7/1995 | Avramidis | ............. F16G 13/04 474/206 |
| 2008/0287239 | A1 | | 11/2008 | Korse | |
| 2009/0247339 | A1 | * | 10/2009 | Chin | ..................... F16G 13/06 474/206 |
| 2010/0267504 | A1 | | 10/2010 | Miyazawa et al. | |
| 2011/0081195 | A1 | * | 4/2011 | Wang | ..................... F16G 13/06 403/154 |
| 2011/0263369 | A1 | | 10/2011 | Kurihara | |

FOREIGN PATENT DOCUMENTS

| | | |
|---|---|---|
| JP | 10-238597 A | 9/1998 |
| JP | 2000-120804 A | 4/2000 |
| JP | 2010-249240 A | 11/2010 |
| KR | 10-2011-0119544 A | 11/2011 |
| WO | 2011/012410 A1 | 2/2011 |

* cited by examiner

Related Art

Related Art

CHAIN AND CHAIN GUIDE PLATE

BACKGROUND OF THE INVENTION

1. Field of the Invention

The present invention relates to a chain configured by alternately arranging in a shifted position by a half pitch in a chain longitudinal direction first plate rows and second plate rows including a plurality of plates arranged in parallel in a chain width direction, with these rows being bendably coupled to one another, and also relates to a chain guide plate used for the chain.

2. Description of the Related Art

There has been known a chain 500 configured by, as shown in FIG. 10, alternately arranging in a shifted position by a half pitch in a chain longitudinal direction, first plate rows 510 including a plurality of plates 520 and 530 arranged in parallel in a chain width direction and second plate rows 540 including a plurality of plates 550 arranged in parallel in the chain width direction, with these rows being bendably coupled with one another with coupling pins 560 (see, for example, Japanese Patent Application Laid-Open No. H10-238597 (Patent Literature 1)).

As a guide method for the chain 500, various methods are known. As one of the methods, there is known a method of setting an outer side guide on the outer side of a chain traveling track and bringing rear surfaces (end faces on a chain bending outer circumferential side) of the plates 520, 530, and 550 into slide contact with a shoe surface of the outer side guide. However, to set the outer side guide, it is necessary to secure an attachment space for the outer side guide on the outer side of the chain traveling track. Therefore, it is sometimes difficult to use the outer side guide depending on an environment of use of the chain 500.

As another guide method for the chain 500, it is also known to set an idler sprocket halfway in the chain traveling track. However, it is sometimes difficult to use the idler sprocket in terms of a setting space and costs because, for example, it is necessary to set a sprocket shaft and a bearing mechanism to set the idler sprocket.

Therefore, as a method of solving the problems of the setting space and the costs in using the outer side guide and the idler sprocket explained above, there is known a method of, as shown in FIG. 11, setting an inner side guide G on the inner side of the chain traveling track, bringing guide slide contact sections 524 formed on a chain bending inner circumferential side of guide plates 520 into slide contact with a shoe surface G1 of the inner side guide G, and guiding the chain 500.

However, when the chain 500 is guided using the inner side guide G, in the conventional chain 500, as shown in FIG. 11, spaces D are formed among the guide slide contact sections 524 of the guide plates 520. Therefore, during chain traveling, the plurality of guide slide contact sections 524 intermittently collide with the shoe surface G1 of the inner side guide G. Noise occurs because of the intermittent collision.

SUMMARY OF THE INVENTION

The present invention has been devised to solve the problems and it is an object of the present invention to provide a chain and a chain guide plate that suppress occurrence of noise during chain traveling while attaining a reduction in costs and also attaining space saving.

According to an aspect of the present invention, there is provided a chain configured by alternately arranging in a shifted position by a half pitch in a chain longitudinal direction first plate rows and second plate rows including a plurality of plates arranged in parallel in a chain width direction, with these rows being bendably coupled to one another, wherein each of the first plate rows includes a guide plate including a pair of pin holes formed side by side in the chain longitudinal direction and a guide slide contact section for coming into slide contact with an inner side guide arranged on a chain bending inner circumferential side, the guide slide contact section extends in the chain longitudinal direction to be asymmetrical relative to an imaginary center line extending in a chain height direction through a center of the pair of pin holes, and during guiding by the inner side guide, lines drawn by the guide slide contact sections of a plurality of the guide plates are continuous in the chain longitudinal direction when viewed in the chain width direction. Consequently, the problems are solved.

According to another aspect of the present invention, there is provided a chain guide plate including a guide slide contact section for coming into slide contact with an inner side guide arranged on a chain bending inner circumferential side. The guide plate includes a pair of pin holes formed side by side in a chain longitudinal direction and the guide slide contact section. The guide slide contact section extends in the chain longitudinal direction to be asymmetrical relative to an imaginary center line extending in a chain height direction through the center of the pair of pin holes. Consequently, the problems are solved.

In inventions according to claims 1 and 7, a guide slide contact section of a guide plate is formed to extend in a chain longitudinal direction to be asymmetrical relative to an imaginary center line. During guiding by an inner side guide, lines drawn by guide slide contact sections of a plurality of guide plates are made continuous in a chain longitudinal direction. Therefore, it is possible to suppress occurrence of noise due to intermittent collision of the plurality of guide plates with the inner side guide while avoiding an increase in the number of guide plates and complication of a chain structure.

In an invention according to claim 2, each of the first plate rows includes two guide plates arranged in a state in which directions of the guide plates in the chain longitudinal direction are reversed each other. Therefore, it is possible to make, using the guide plates having the same shape, the lines drawn by the guide slide contact sections of the plurality of guide plates continuous in the chain longitudinal direction.

In an invention according to claim 3, the guide plates are arranged on both outer sides, in the chain width direction, of each of the first plate rows. Consequently, it is possible to improve contact balance between the guide plates and the inner side guide. Further, it is possible to cause the guide plates to play a function of preventing disengagement of the chain and a sprocket.

In an invention according to claim 4, the guide slide contact section includes a plurality of curved concave surface sections having different curvature radiuses. Therefore, when a plurality of inner side guides having different curvature radiuses are used, it is possible to satisfactorily maintain a contact state of the inner side guides and the guide plate.

In an invention according to claim 5, a curvature center of a curved concave surface section formed in a position crossing the imaginary center line is located on the imaginary center line. Therefore, it is possible to satisfactorily set the entire surface of the curved concave surface section in contact with a curved shoe surface of the inner side guide.

In an invention according to claim 6, a curvature radius of a second curved concave surface section arranged adjacent to the curved concave surface section formed in the position crossing the imaginary center line is set larger than a curvature radius of the curved concave surface section. Therefore, it is possible to prevent the second curved concave surface section from hindering slide contact of the curved concave surface and the inner side guide.

DESCRIPTION OF THE PREFERRED EMBODIMENT

Embodiments

A chain 100 according to a first embodiment of the present invention is explained below with reference to FIGS. 1 to 4.

Figure 2:
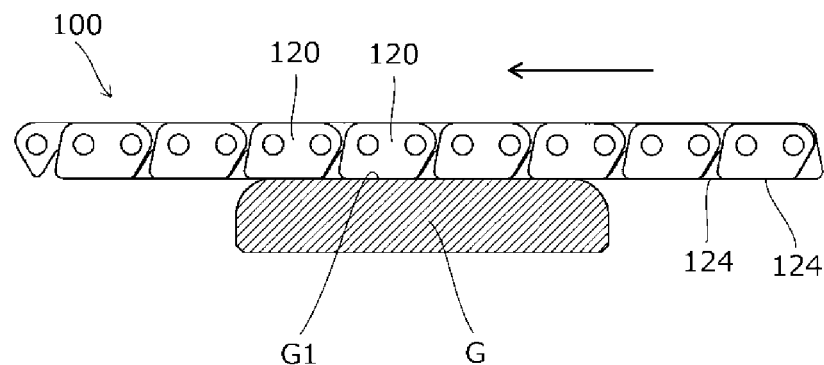
FIG. 2 is an explanatory diagram showing a use form of the chain in the first embodiment.

The chain 100 in the first embodiment is configured as a timing chain incorporated in a timing system for an automobile engine. As shown in FIG. 2, the chain 100 travels on a predetermined track in a state in which the chain 100 is wound around a plurality of sprockets (not shown in the figure) and a chain bending inner circumferential side is guided by an inner side guide G having a flat shoe surface G1. The inner side guide G is configured as a fixed guide fixed to a peripheral section or the like of an engine block or the like or a swinging guide swingably attached to the peripheral section and pressed to the chain 100 side by a tensioner.

Figure 1:
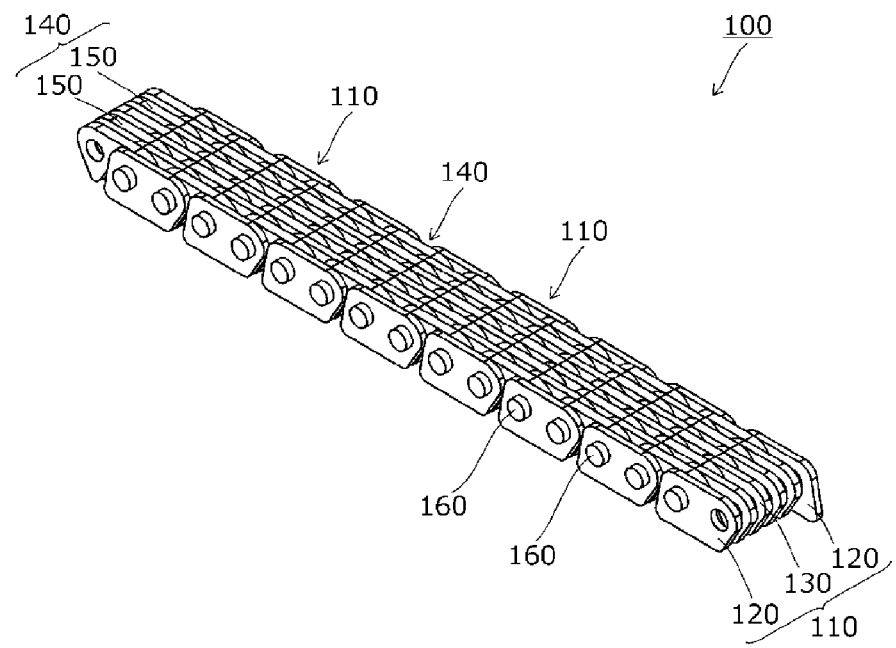
FIG. 1 is a perspective view showing a chain in a first embodiment.

In the chain 100, as shown in FIG. 1, a plurality of first plate rows 110 and a plurality of second plate rows 140 are shifted by a half pitch in a chain longitudinal direction, alternately arranged, and bendably coupled.

As shown in FIG. 1, the first plate row 110 is configured from a pair of guide plates 120 arranged on both outer sides in a chain width direction and a plurality of first inner plates 130 arranged between the pair of guide plates 120. The second plate row 140 is configured from a plurality of second inner plates 150 arranged in parallel in the chain width direction.

Each of the guide plate 120, the first inner plate 130, and the second inner plate 150 includes a pair of pin holes formed side by side in the chain longitudinal direction. The plurality of first plate rows 110 and the plurality of second plate rows 140 are bendably coupled by inserting coupling pins 160 into the pin holes of the first inner plates 130 and the second inner plates 150 in a loose fit state and fixing both end sides of the coupling pins 160 to pin holes 121 of the guide plates 120. Each of the first inner plate 130 and the second inner plate 150 includes a pair of V-shaped link teeth for meshing with a sprocket (not shown in the figure) on a chain bending inner circumferential side.

A specific form of the guide plate 120 most characterizing the chain 100 in this embodiment is explained below.

Figure 3:
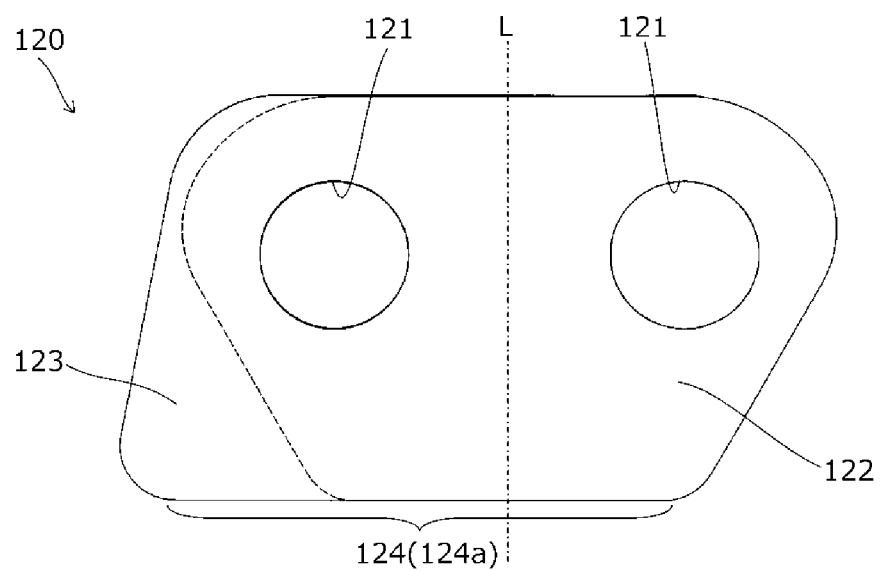
FIG. 3 is an explanatory diagram showing guide plates in the first embodiment.

The guide plate 120 includes, as shown in FIG. 3, a plate base section 122 including a pair of pin holes 121 formed side by side in the chain longitudinal direction and a plate swelling section 123 swelling to the chain longitudinal direction side from one end edge in the chain longitudinal direction of the plate base section 122. The plate base section 122 is formed in a symmetrical shape with respect to an imaginary center line L extending in a chain height direction through the center of the pair of pin holes 121.

On the end face on the chain bending inner circumferential side of the guide plate 120, as shown in FIG. 3, a guide slide contact section 124 for coming into slide contact with the inner side guide G is formed. In this embodiment, the guide slide contact section 124 is configured from a flat surface section 124a and formed over the plate base section 122 and the plate swelling section 123. The guide slide contact section 124 extends in the chain longitudinal direction to be asymmetrical relative to the imaginary center line L.

Figure 4:
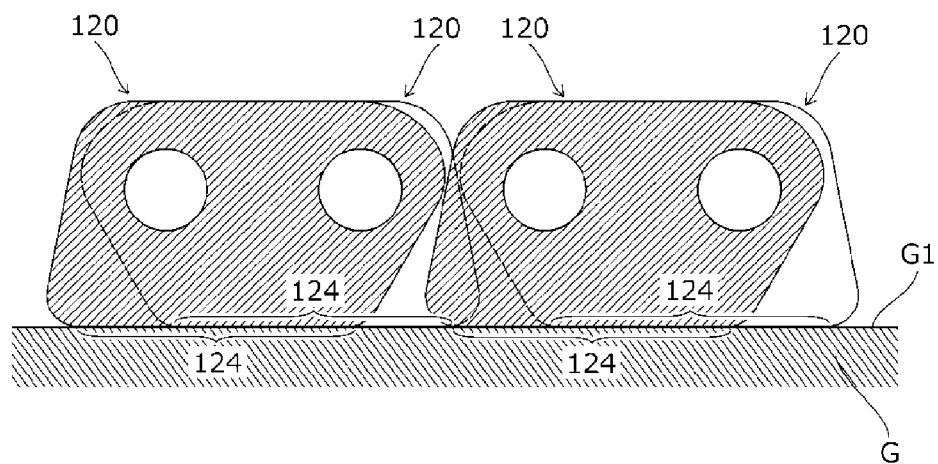
FIG. 4 is an explanatory diagram showing a contact state of the guide plates and an inner side guide in the first embodiment.

As it is seen from FIGS. 1 and 4, the pair of guide plates 120 included in each of the first plate rows 110 is arranged in a state in which directions in the chain longitudinal direction of the guide plates 120 (swelling directions of the plate swelling sections 123) are reversed each other. Consequently, as shown in FIG. 4, lines drawn by the guide slide contact sections 124 of the plurality of guide plates 120 during guiding by the inner side guide G are continuous in the chain longitudinal direction when viewed in the chain width direction. Note that, in FIG. 4, the guide plates 120 located on the paper surface front side are hatched and the guide plates 120 located on the paper surface inner side are not hatched.

A chain 200 according to a second embodiment of the present invention is explained with reference to FIGS. 5 to 9. The second embodiment is the same as the first embodiment except a part of the configuration. Therefore, 100 series reference numerals described in the specification and the drawings concerning the first embodiment are replaced with 200 series reference numerals, whereby explanation of the components other than differences is omitted.

Figure 5:
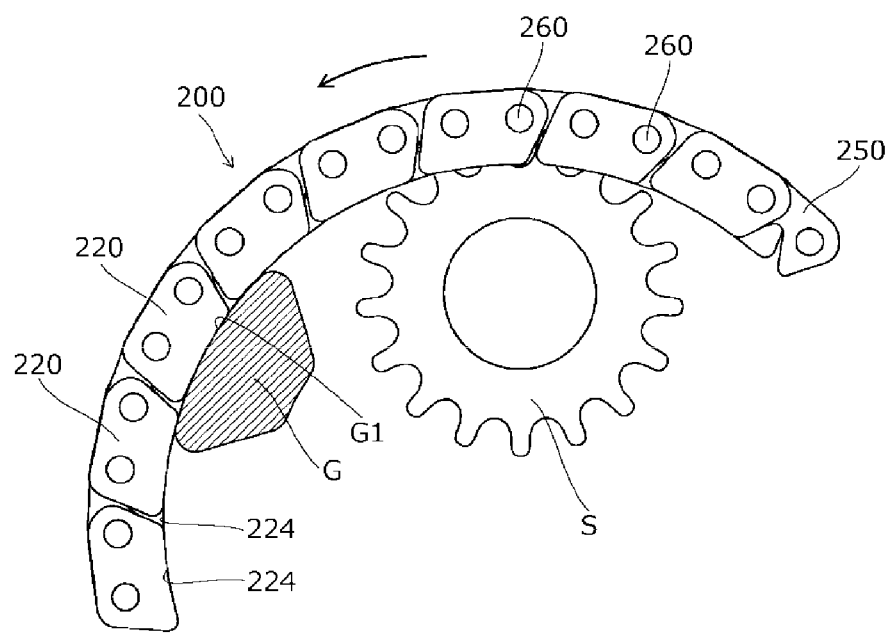
FIG. 5 is a use form diagram showing a chain in a second embodiment.
Figure 6:
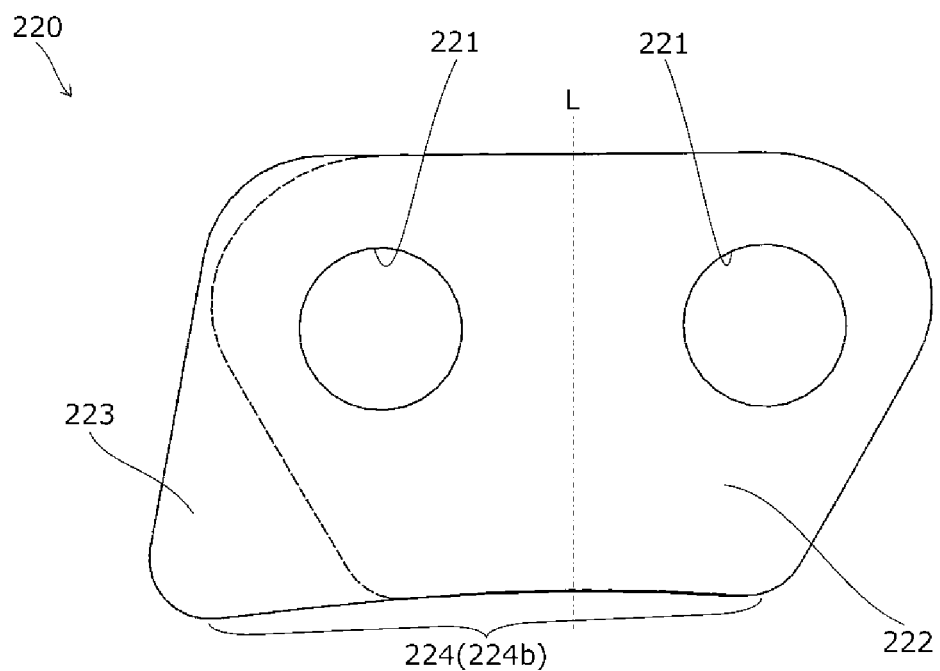
FIG. 6 is an explanatory diagram showing guide plates in the second embodiment.
Figure 7:
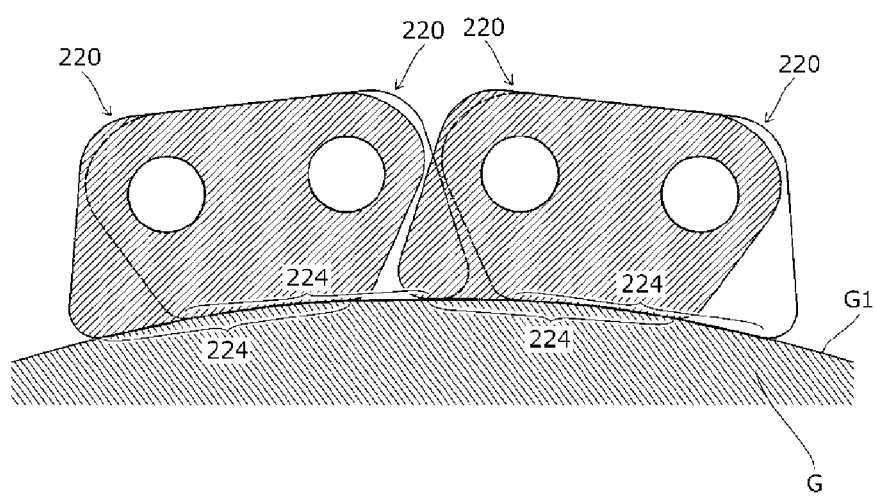
FIG. 7 is an explanatory diagram showing a contact state of the guide plates and an inner side guide in the second embodiment.

As shown in FIG. 5, the chain 200 in the second embodiment travels in a state in which the chain 200 is guided by the inner side guide G including the shoe surface G1 having a curved convex surface shape. Accordingly, a guide slide contact section 224 of a guide plate 220 is configured from a single curved concave surface section 224b. The curved concave surface section 224b is formed to be curved at a curvature radius same as the curvature radius of the shoe surface G1 of the inner side guide G centering on a bending center located on the imaginary center line L.

The guide plate 220 according to a first modification of the second embodiment is explained with reference to FIG. 8.

Figure 8:
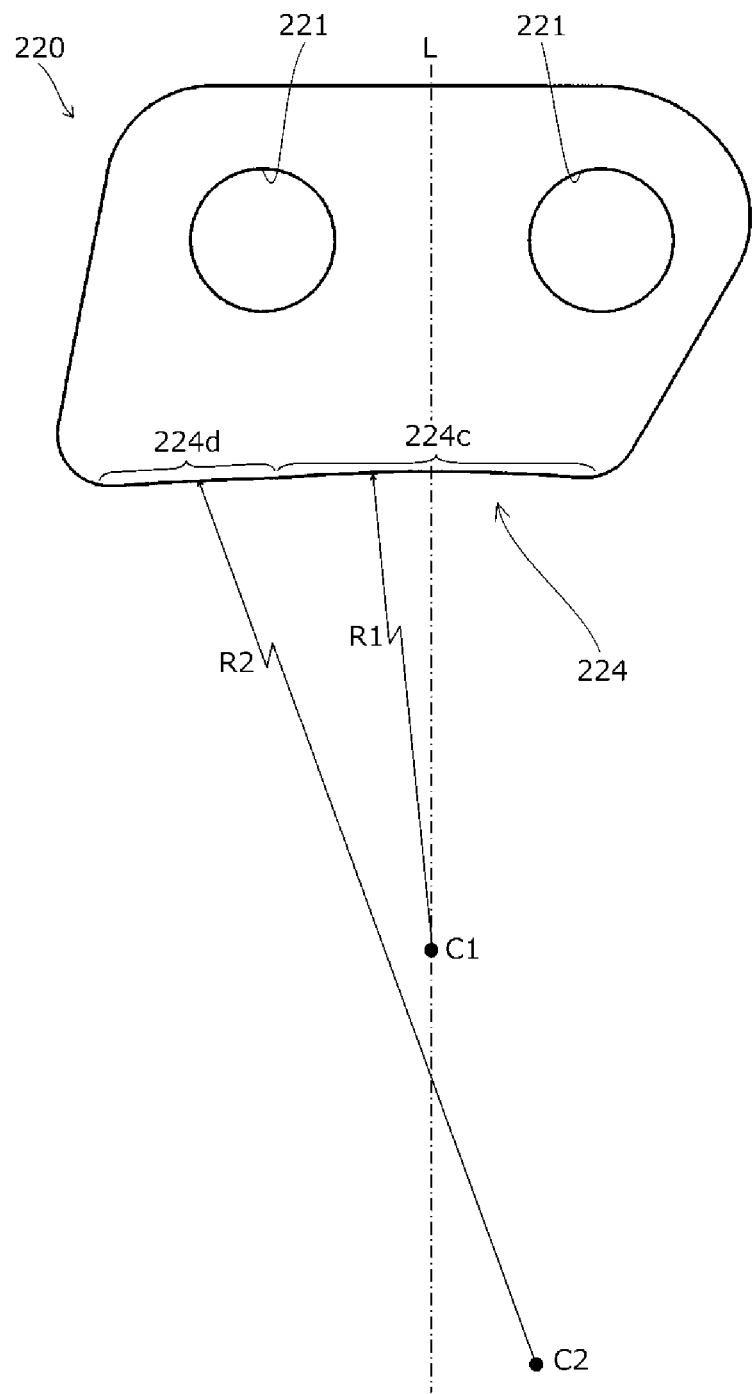
FIG. 8 is an explanatory diagram showing a first modification of the guide plates in the second embodiment.

In the guide plate 220 in the first modification, as shown in FIG. 8, the guide slide contact section 224 is configured from a first curved concave surface section 224*c* and a second curved concave surface section 224*d* having different curvature radiuses.

As shown in FIG. 8, the first curved concave surface section 224*c* is formed in a position crossing the imaginary center line L and formed to be curved at a curvature radius R1 centering on a bending center C1 located on the imaginary center line L. The second curved concave surface section 224*d* is formed adjacent to the first curved concave surface section 224*c* and formed to be curved at a curvature radius R2 centering on a bending center C2 located on the opposite side of a forming position of the second curved concave surface section 224*d* with respect to the imaginary center line L. The curvature radius R2 of the second curved concave surface section 224*d* is larger than the curvature radius R1 of the first curved concave surface section 224*c*. By forming the first curved concave surface section 224*c* and the second curved concave surface section 224*d* in this way, it is possible to prevent ups and downs from being formed in the guide slide contact section 224 and smoothly connect the first curved concave surface section 224*c* and the second curved concave surface section 224*d*.

The guide plate 220 according to a second modification of the second embodiment is explained with reference to FIG. 9.

Figure 9:
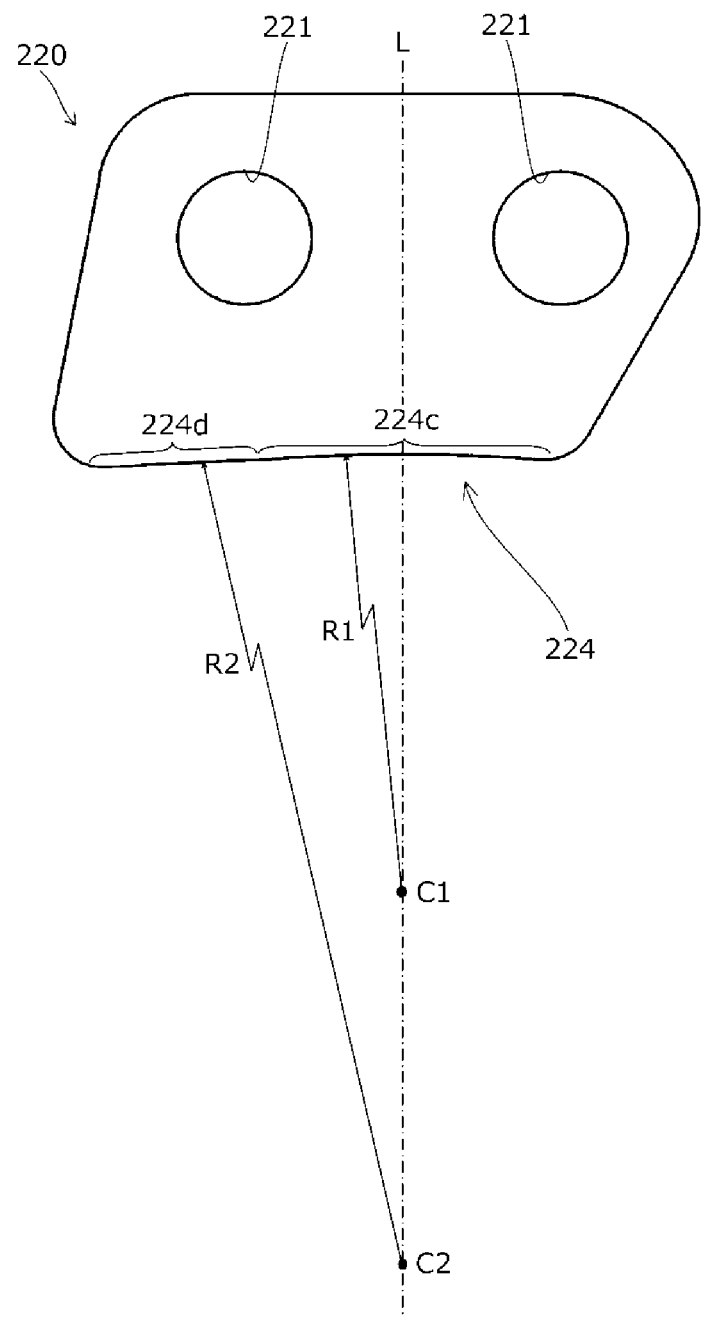
FIG. 9 is an explanatory diagram showing a second modification of the guide plates in the second embodiment.
Figure 10:
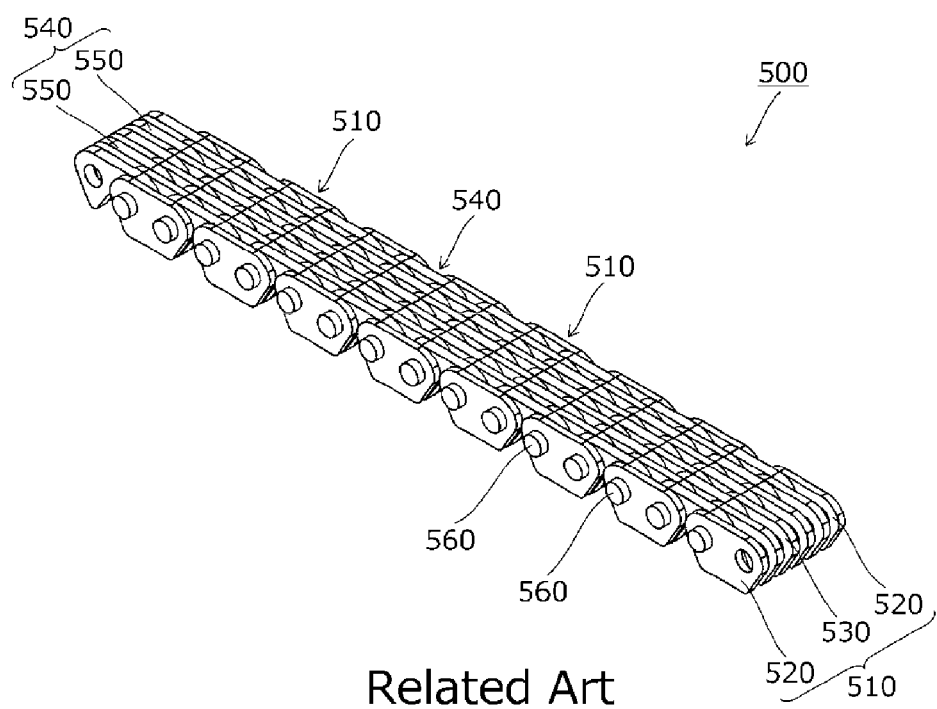
FIG. 10 is a perspective view showing a conventional chain.
Figure 11:
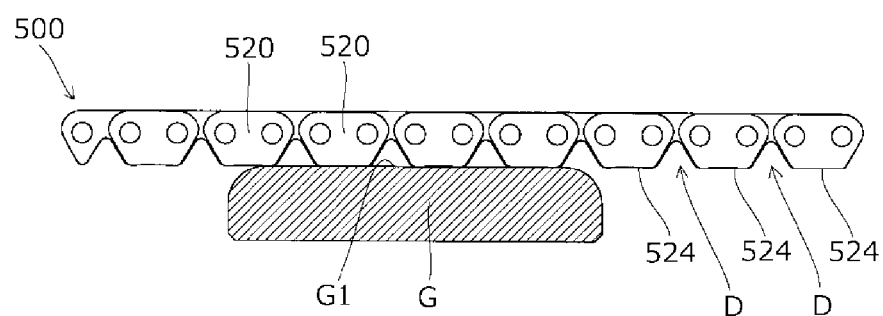
FIG. 11 is an explanatory diagram showing a use form of the conventional chain.

In the guide plate 220 in the second modification, unlike the first modification, as shown in FIG. 9, the bending center C2 of the second curved concave surface section 224*d* is located on the imaginary center line L. Consequently, when two inner side guides G having different bending radiuses of the shoe surface G1 are used, even when the guide plate 220 comes into contact with the inner side guides G centering on any one of the curved concave surface sections 224*c* and 224*d*, it is possible to maintain a smooth slide contact state of the inner side guides G and the curved concave surface sections 224*c* and 224*d*.

Note that, as in the first modification and the second modification of the second embodiment, when a plurality of curved concave surface sections 224*c* and 224*d* having different curvature radiuses are formed in the guide slide contact section 224, a slight gap is partially formed between the guide slide contact section 224 and the shoe surface G1 of the inner side guide G. However, since lubricant is present between the guide slide contact section 224 and the shoe surface G1 of the inner side guide G, the slight gap does not hinder the smooth slide contact.

In the embodiments, the chain is explained as the timing chain for the automobile engine. However, the use of the chain of the present invention is not limited to this. The chain may be any chain such as a chain for transmission and a chain for conveyance.

In the embodiments, the chain of the present invention is explained as a silent chain. However, a specific form of the chain may be any chain formed by alternately arranging in a shifted position by a half pitch in a chain longitudinal direction first plate rows and second plate rows including a plurality of plates arranged in parallel in a chain width direction, with these rows being bendably coupling with one another, and may be, for example, a roller chain and a bush chain.

In the embodiments, the guide plates are explained as being arranged one each on both the outer sides in the chain width direction of each of the first plate rows. However, specific arrangement, number, and the like of the guide plates may be any arrangement, number, and the like.

In the embodiments, the example in which the guide slide contact section of the guide plate is configured from only the flat surface section (the first embodiment), the example in which the guide slide contact section is configured from only the single curved concave surface section (the second embodiment), and the example in which the guide slide contact section is configured from the two curved concave surface section having the different curvature radiuses (the first modification and the second modification of the second embodiment) are explained. However, a specific form of the guide slide contact section is not limited to this and may be configured by combining the flat surface section and the curved concave surface section. The numbers of flat surface sections and curved concave surface sections to be combined only have to be arbitrarily determined.

The configurations of the embodiments and the modifications may be arbitrarily combined to configure a chain.

The materials of the components of the chain may be any materials such as metal and resin.

What is claimed is:

1. A chain configured by alternately arranging in a shifted position by a half pitch in a chain longitudinal direction first plate rows and second plate rows, the rows including a plurality of plates arranged in parallel in a chain width direction, with the rows being movably coupled to one another, wherein
    each of the plate rows includes a plurality of inner plates and each of the second plate rows includes a plurality of inner plates,
    each of the first plate rows includes a plurality of guide plates each including a pair of pin holes formed side by side in the chain longitudinal direction and a guide slide contact section for coming into slide contact with an inner side guide arranged on a chain bending inner circumferential side,
    each guide slide contact section extends in the chain longitudinal direction asymmetrically relative to an imaginary center line extending in a chain height direction through a center between the pair of pin holes,
    the plurality of guide plates in a first row of said first plate rows includes at least two guide plates having swelling sections forming part of the respective guide slide contact section that extend reversely from one another in the chain longitudinal direction, and the plurality of guide plates in a second row of said first plate rows also includes at least two guide plates having swelling sections forming part of the respective guide slide contact section that extend reversely from one another in the chain longitudinal direction, and
    during guiding by the inner side guide, a collective longitudinal span of contact surfaces, extending in the chain longitudinal direction, of the guide slide contact sections of the plurality of the guide plates in the first row of said first plate rows extends at least to a collective longitudinal span of contact surfaces, extending in the chain longitudinal direction, of the guide slide contact sections of the plurality of the guide plates in the second row of said first plate rows that is adjacent said first row of said first plate rows, whereby a combined collective longitudinal span of the contact surfaces of said first row of said first plate rows and said second row of said first plate rows together are continuous in the chain longitudinal direction when viewed in the chain width direction facing said pin holes.

2. The chain according to claim 1, wherein each row of the first plate rows includes at least two guide plates arranged in a state in which directions of the guide plates in the chain longitudinal direction are reversed each other.

3. The chain according to claim 1, wherein the guide plates are arranged on both outer sides, in the chain width direction, of each row of the first plate rows.

4. The chain according to claim 1, wherein the guide slide contact section includes a plurality of curved concave surface sections having different curvature radiuses.

5. The chain according to claim 1, wherein
the guide slide contact section includes a curved concave surface section formed in a position crossing the imaginary center line, and
a curvature center of the curved concave surface section is located on the imaginary center line.

6. The chain according to claim 5, wherein
the guide slide contact section further includes a second curved concave surface section formed adjacent to the curved concave surface section in the chain longitudinal direction, and
a curvature radius of the second curved concave surface section is larger than a curvature radius of the curved concave surface section.

* * * * *